US008695018B2

(12) United States Patent
Kren

(10) Patent No.: US 8,695,018 B2
(45) Date of Patent: Apr. 8, 2014

(54) EXTENSIBLE FRAMEWORK FOR HANDLING DIFFERENT MARK UP LANGUAGE PARSERS AND GENERATORS IN A COMPUTING DEVICE

(75) Inventor: David Kren, London (GB)

(73) Assignee: Nokia Corporation, Espoo (FI)

( * ) Notice: Subject to any disclaimer, the term of this patent is extended or adjusted under 35 U.S.C. 154(b) by 1945 days.

(21) Appl. No.: 10/574,728

(22) PCT Filed: Oct. 7, 2004

(86) PCT No.: PCT/GB2004/004276
§ 371 (c)(1),
(2), (4) Date: Apr. 6, 2006

(87) PCT Pub. No.: WO2005/036390
PCT Pub. Date: Apr. 21, 2005

(65) Prior Publication Data
US 2007/0006068 A1 Jan. 4, 2007

(30) Foreign Application Priority Data

| Oct. 7, 2003 | (GB) | 0323439.0 |
| Oct. 7, 2003 | (GB) | 0323440.8 |
| Oct. 7, 2003 | (GB) | 0323442.4 |

(51) Int. Cl.
G06F 13/00 (2006.01)
G06F 9/44 (2006.01)
G06F 9/45 (2006.01)
G06F 17/00 (2006.01)

(52) U.S. Cl.
USPC ........... 719/328; 717/136; 717/137; 717/140; 717/143; 715/236; 715/237

(58) Field of Classification Search
USPC ........... 719/328, 331; 715/234; 717/140–143; 709/201
See application file for complete search history.

(56) References Cited

U.S. PATENT DOCUMENTS

| 6,813,637 B2 * | 11/2004 | Cable ........................... 709/226 |
| 2002/0184401 A1 | 12/2002 | Kadel et al. ................... 719/315 |
| 2003/0079052 A1 * | 4/2003 | Kushnirskiy ................. 709/328 |

(Continued)

FOREIGN PATENT DOCUMENTS

| WO | WO 00/79365 A2 | 12/2000 |
| WO | WO 02/17075 A2 | 2/2002 |
| WO | WO 03/014971 A2 | 2/2003 |
| WO | WO 03/046757 A2 | 6/2003 |

OTHER PUBLICATIONS

Pervagus, Inc., "Exploring Mobile Applications Technology Landsape" Whitepaper, 2002, Retrieved from internet, pp. 1-14.

(Continued)

*Primary Examiner* — H S Sough
*Assistant Examiner* — Phuong Hoang
(74) *Attorney, Agent, or Firm* — Alston & Bird LLP

(57) ABSTRACT

A computing device programmed with an extensible framework that accepts one or more mark-up language parsers and/or generators, each implemented as plug-ins to the framework, with different plug-ins enabling different kinds of mark up languages to be handled by the device. In this way, the client is no longer tied to a single kind of parser or generator; it can operate with any different kind of parser compatible with the intermediary layer, yet it remains far simpler that prior art clients that are hard-coded to operate directly with several different kinds of parsers and generators.

31 Claims, 7 Drawing Sheets

(56) References Cited

U.S. PATENT DOCUMENTS

2003/0172348 A1* 9/2003 Fry et al. .................. 715/513
2003/0237050 A1* 12/2003 Davidov et al. ............ 715/513

OTHER PUBLICATIONS

David Mery, "Symbian OS Version 6.x functional description", Feb. 2003, Retrieved from internet, pp. 1-20.

* cited by examiner

| Element type name |
|---|
| Addr |
| AddType |
| Auth |
| AuthLevel |

| WBXML token |
|---|
| 5 |
| 6 |
| 7 |
| 8 |

Figure 8

EXTENSIBLE FRAMEWORK FOR HANDLING DIFFERENT MARK UP LANGUAGE PARSERS AND GENERATORS IN A COMPUTING DEVICE

CROSS REFERENCE TO RELATED APPLICATIONS

This application claims the priority of PCT/GB2004/004276 filed on Oct. 7, 2004 and GB 0323442.4 filed on 7 Oct. 2003; GB 0323439.0 filed on 7 Oct. 2003; and, GB 0323440.8 filed on 7 Oct. 2003 filed on Oct. 7, 2003, the entire contents of which are hereby incorporated in total by reference.

FIELD OF THE INVENTION

This invention relates to an extensible framework for handling different mark up language parsers and generators. The invention finds application in a computing device. Its advantages are especially valuable for a resource constrained mobile computing device, i.e. a battery powered, portable device in which there are power and memory constraints, but are relevant to other kinds of computing devices, such as desktop PCs, set top boxes etc.

DESCRIPTION OF THE PRIOR ART

Mark-up language is a set of codes in a text or binary file that enable a computing device to format the text for correct display or printing. A client (i.e. any process that requests a service from another process) in a software system creates mark-up language using a 'generator'. It reads and interprets mark-up language using a 'parser'.

In the prior art, parsers and generators have been specific to certain kinds of mark-up languages. For example, a client could use an XML (extensible mark-up language) parser to interpret and handle XML files; it could use a separate WBXML (WAP binary XML) parser to interpret and handle WBML files. In recent years, there has been a proliferation of different mark-up languages: the conventional approach has been to deploy in device ROM several separate fully functioning parsers for each mark up language that the device needs to parse. This inevitably takes up valuable ROM space; as there may need to be an instantiation of each parser at the same time, valuable RAM may also be occupied.

Furthermore, in the prior art, the client talks directly to the XML parser and the separate WBXML parser. Also, when the client needs to generate mark-up language format files, there could be an XML generator and a separate WBXML generator. Again, the client would talk directly to each generator. Clients therefore have had to be hard-coded to handle and talk directly with these specific kinds of parsers and generators; in practice, this has meant that clients are either extremely complex if they need to handle several different mark up language formats (further increasing the demand on both ROM and also RAM memory) or else they are restricted to a single mark-up language format.

SUMMARY OF THE PRESENT INVENTION

The present invention is a computing device programmed with an extensible framework that accepts one or more mark-up language parsers and/or generators, each implemented as plug-ins to the framework, with different plug-ins enabling different kinds of mark up languages to be handled by the device.

The framework is an API (which term includes a set of APIs) that enables different types of mark-up parsers and generators to be included in the framework by means of the parser/generator plug-ins. A plug-in is a replaceable item of executable code that provides specific services to a loosely coupled application that can load or invoke it at run-time; it can therefore extend the framework at run-time (i.e. there is no need to recompile or change the framework for a plug-in to work).

This approach has many advantages over the conventional approach of hard-coding clients to specific parsers and generators. Because of the extensible plug-in design, it is possible to allow new kinds of parsers and generators to be loaded onto a device after that device has been shipped to an end-user. The only requirement is that they are implemented as plug-ins that are compatible with the extensible framework. This is especially useful in the context of mark up language parsers and generators since there are many potential languages that might need to be handled by a device but it is impractical to hard-code the capability to handle all of these when the device is designed because of the memory overhead.

Hence, a core further technical advantage offered by the present invention is that it reduces memory requirements; this in turn can lead to faster loading of code and/or less use of virtual memory. These advantages are especially useful in mobile computing devices, where techniques that reduce power consumption and extend battery life are very valuable. The term 'mobile computing device' should be expansively construed to cover mobile telephones, smartphones, personal organisers, wireless information device and any other kind of portable, mobile computing device. But these advantages are also valuable in fixed computing devices such as PCs, set top boxes, games consoles etc. and can lead directly to lower BOM (bill of material) costs because of the lower memory requirements.

Also, since new mark up languages (or extensions/variants to existing languages, including new schemas) are frequently developed, the ability to extend an existing design of computing device to handle these new or extended languages is very useful. The extensible framework may be a stand alone application or may form part of a device operating system: if the latter, a particular version of the operating system that includes the extensible framework can be developed and included in device ROM for a broad range of computing devices: this version will be able to handle different kinds of mark up languages when appropriate parser/generator plug ins are used.

In one implementation, the extensible framework (i) insulates a client running on the device from having to communicate directly with a parser or generator and (ii) is generic in that it presents a common API to the client irrespective of the specific kind of parser or generator deployed. An advantage of this is that it allows not only different parsers and generators to be readily used by the same client, but it allows also several different clients to share the same parsers and generators as well. In addition, clients can be far simpler than prior art designs that could handle several different mark-up language parsers or generators: this leads to smaller memory requirements in both ROM and RAM.

Because the framework (e.g. the API) is extensible, extensions to its capabilities (e.g. to enable a new/extended mark-up language of a document to be handled) can be made without affecting compatibility with existing clients or existing parsers and generators. This may be achieved through an updated/extended namespace plug-in; this plug-in sets-up all the elements, attributes and attribute values for a namespace. Similarly, new kinds of clients can be provided for loading onto a device after that device has been shipped to an end-user. The only requirement is that they are compatible with the intermediary layer.

The API is typically implemented as a header file.

The specific kind of parser or generator being used is not known to the client: the intermediary layer fully insulates the client from needing to be aware of these specifics. Instead, the client deals only with the intermediary layer, which presents to the client as a generic parser or a generic generator—i.e. a parser or generator which behaves in a way that is common to all parsers or generators.

For example, the SyncML the protocol supports both XML and WBXML. By using both XML and WBXML parser and generator plug-ins in to the framework, a SyncML client can use either or both type of parser and generator without knowing about the type of mark-up language; as a result, the design of the SyncML client is greatly simplified. Since WBXML and X are quite different in the way they represent their data, one very useful feature of the invention is the mapping of WBXML tokens to a string in a static string pool table. Appendix C expands on this idea.

The present invention may provide a flexible and extensible file conversion system: for example, the device could parse a document written in one mark up language format and then use the parsed document data to generate an equivalent document in a different file format.

Another feature of the present invention is that the mark-up language parser or generator may access components to validate, pre-filter or alter data, in which the components are plug-in components to the extensible framework that operate using a 'chain of responsibility' design pattern. They may be plug-ins to the extensible framework described above.

Because of the plug-in design of the these components, the system is inherently flexible and extensible compared with prior art systems in which a component (for validating, pre-filtering or altering data from a parser or generator) would be tied exclusively to a given parser. Hence, if a mark up language of a document is extended, or a new one created, it is possible to write any new validation/pre-filter/altering plug-in that is needed to work with the extended or new language. These new kinds of validation/pre-filter/altering plug-ins can be provided for loading onto a device even after that device has been shipped to an end-user. Further, any of these plug-ins will work with any existing parser or generator that is itself a plug-in to the extensible framework, i.e. uses the same generic API.

BRIEF DESCRIPTION OF THE DRAWINGS

The present invention will be described with reference to the acompanyuing drawings, in which:

FIG. 8 shows how WBXML tokens map to strings.

DETAILED DESCRIPTION

Overview of Key Features

Figure 1:
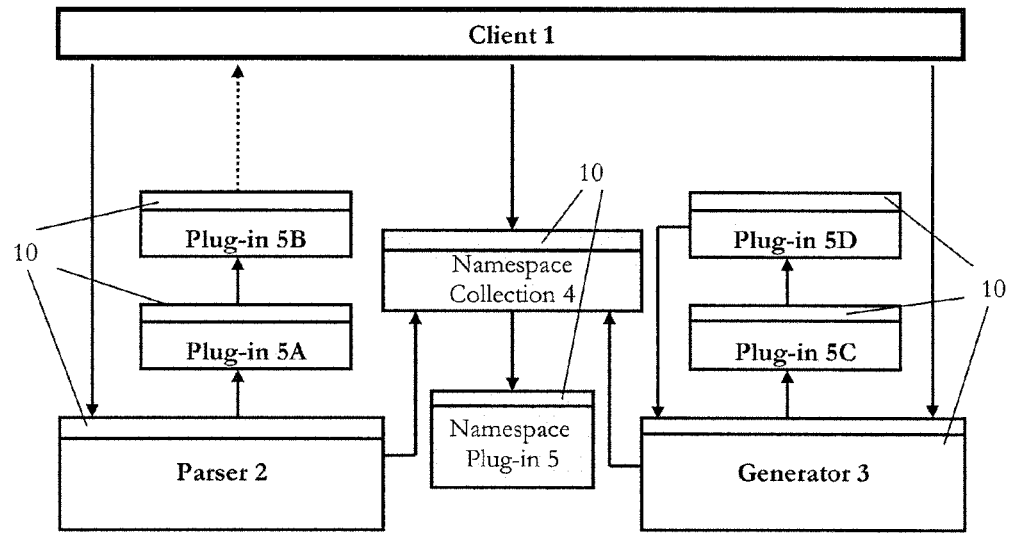
FIG. 1 is a schematic block diagram of an extensible framework for handling mark up languages; a parser, generator, client and four further plug-ins are shown.

The present invention is implemented in a system called the Mark-Up Language Framework, used in SymbianOS from Symbian Limited, London, United Kingdom. SymbianOS is an operating system for smart phones and advanced mobile telephones, and other kinds of portable computing devices.

The Mark-Up Language framework implements three key features.

1. Generic Parser Extensible Framework

Clients are separated from mark-up language parsers/generators by an extensible framework that accepts one or more mark-up language parsers and/or generators, each implemented as plug-ins to the framework, with different plug-ins enabling different kinds of mark up languages to be handled by the device. The extensible framework is in effect an intermediary (i.e. abstraction) layer that (a) insulates the client from having to communicate directly with the parser or generator and is (b) generic in that it presents a common API to the client irrespective of the specific kind of parser or generator the intermediary layer interfaces with.

2. Data Validation/Pre-Filtering and Altering Components in a Chain of Responsibility Mark-up language parser or generator plug-ins to the extensible framework can access components to validate, pre-filter or alter data; the components are plug-in components to the extensible framework that operate using a 'chain of responsibility' design pattern.

3. Generic Data Supplier API

The mark-up language parsers or generators can access data from a source using a generic data supplier API, insulating the parser or generator from having to communicate directly with the data source.

Each of this features will now be discussed in more detail.

1. Generic Parser Extensible Framework

The essence of this approach is that the parsers and generators are plug-ins to an extensible framework; the framework is in one implementation part of the operating system of the device. The present invention may hence readily allow the device to operate with different kinds of parsers and generators: this extensibility is impossible to achieve with prior art hard-coded systems.

The client interfaces with a mark up language parser or a generator via the extensible framework intermediary layer: this layer (a) insulates the client from having to communicate directly with the parser or generator and is (b) generic in that it presents a common API to the client irrespective of the specific kind of parser or generator the intermediary layer interfaces with.

In this way, the client is no longer tied to a single kind of parser or generator; it can operate with any different kind of parser compatible with the intermediary layer, yet it remains far simpler than prior art clients that are hard-coded to operate directly with several different kinds of parsers and generators.

The API is typically implemented as a header file. The specific kind of parser or generator being used is not known to the client: the intermediary layer fully insulates the client from needing to be aware of these specifics. Instead, the client deals only with the intermediary layer, which presents to the client as a generic parser or a generic generator—i.e. a parser or generator which behaves in a way that is common to all parsers or generators.

For example, the SyncML the protocol supports both XML and WBXML. By using both XML and WBXML parser and generator plug-ins in to the framework, a SyncML client can use either or both type of parser and generator without knowing about the type of mark-up language; as a result, the design of the SyncML client is greatly simplified. Since WBXML and XML are quite different in the way they represent their data, one very useful feature of the invention is the mapping of WBXML tokens to a string in a static string pool table. Appendix C expands on this idea.

The present invention may provide a flexible and extensible file conversion system: for example, the device could parse a document written in one mark up language format and then use the parsed document data to generate an equivalent document in a different file format. Because of the extensible plug-in design of an implementation of the system, it is possible to provide far greater kinds of file conversion capabilities than was previously the case. New kinds of parsers and generators can be provided for loading onto a device after that device has been shipped to an end-user. The only requirement is that they are compatible with the intermediary layer.

Another advantage of the present invention is that it allows not only different parsers and generators to be readily used by the same client, but it allows also several different clients to share the same parsers and generators as well. The API may itself be extensible, so that extensions to its capabilities (e.g. to enable a new/extended mark-up language of a document to be handled) can be made without affecting compatibility with existing clients or existing parsers and generators. Similarly, new kinds of clients can be provided for loading onto a device after that device has been shipped to an end-user. The only requirement is that they are compatible with the intermediary layer.

2. Data Validation/Pre-Filtering and Altering Components in a Chain of Responsibility The essence of this approach is that the mark-up language parser or generator can access components to validate, pre-filter or alter data, in which the components are plug-in components that operate using a chain of responsibility. They may be plug-ins to the extensible framework described above.

Because of the plug-in design of the components, the system is inherently flexible and extensible compared with prior art systems in which a component (for validating, pre-filtering or altering data from a parser or generator) would be tied exclusively to a given parser. Hence, if a mark up language of a document is extended, or a new one created, it is possible to write any new validation/pre-filter/altering plug-in that is needed to work with the extended or new language. These new kinds of validation/pre-filter/altering plug-ins can be provided for loading onto a device even after that device has been shipped to an end-user. The 'chain of responsibility' design pattern, whilst known in object oriented programming, has not previsouly been used in the present context.

The plug-in components may all present a common, generic API to the parser and generator. Hence, the same plug-in can be used with different types of parsers and generators (e.g. a XML parser, a WBXML parser, a RTF parser etc.). The plug-ins also present a common, generic API to a client component using the parser or generator. Hence, the same plug-ins can be used by different clients.

For example a DTD validator plug-in could be written that validates the mark-up of a document and can report errors to the client. Or for a web browser an auto correction plug-in filter could be written that tries to correct errors found in the mark-up language, such as a missing end element tag, or a incorrectly placed element tag. The auto correction plug-in will, if it can, fix the error transparently to the client. This enables a web browser to still display a document rather then just displaying an error reporting that there was an error in the document Because the plug-ins can be chained together, complex and different type of filtering and validation can take place. In the example above the parser could notify the validator plug-in of elements it is parsing and these in turn would go to the auto correction plug-in to be fixed if required and finally the client would receive these events.

The mark-up framework allows parser plug-ins to expose the parsed element stack to all validation/pre-filter/altering plug-ins. (The parsed element stack is a stack populated with elements from a document extracted as that document is parsed; this stack is made available to all validation/pre-filter/altering plug-ins to avoid the need to duplicate the stack for each of these plug-ins). This also enables the plug-ins to use the stack information to aid in validation and filtering. For example an auto corrector plug-in may need to know the entire element list that is on the stack in order to figure out how to fix a problem.

The use of filter/validator plug-ins in mark-up language generators is especially useful for developers writing a client to the framework and generating mark-up documents as the same validator plug-in used by the parser can be used in the generator. Errors are reported to the client when the mark-up does not conform to the validator which will enable the developer to make sure they are writing well formed mark-up that conforms to the DTD and catch error early on during development.

The mark-up framework incorporates a character conversion module that enables documents written in different character sets (e,g, ASCII, various Kanji character sets etc.) to be parsed and converted to UTF8. This means a client obtains the results from the parser in a generic way (UTF8) without having to know the original character set that was used in the document. Clients hence no longer need to be able to differentiate between different character sets and handle the different character sets appropriately.

3. Generic Data Supplier API

The mark-up language parser or generator accesses data from a source using the extensible framework—i.e. a generic data supplier API. Hence, the parser or generator is insulated from having to talk directly to a data source; instead, it does so via the generic data supplier API, acting as an intermediary layer. This de-couples the parser or generator from the data source and hence means that the parser or generator no longer have to be hard coded for a specific data supplier. This in turn leads to a simplification of the parser and generator design.

The present invention allows parsing and generation to be carried out with any data source. For example, a buffer in memory could be used, as could a file, as could streaming from a socket (hence enabling the ability to parse in real-time from data streamed over the internet). There is no requirement to define, at parser/generator build time, what particular data source will be used. Instead, the system allows any source that can use the generic data supplier API to be adopted. New types of data sources can be utilised by computing device, even after those devices have been shipped to end-users.

The present invention is implemented in a system called the Mark-Up Language Framework, used in SymbianOS from Symbian Limited, London, United Kingdom. SymbianOS is an operating system for smart phones and advanced mobile telephones, and other kinds of portable computing devices.

The following describes the Mark-Up Language Framework in more detail. Appendix C describes a particular technique, referred to as 'String Pool', which is used in the Mark- Up Language Framework. Various SymbianOS specific programming techniques and structures are referred to. There is an extensive published literature describing these techniques; reference may for example be made to "Professional Symbian Programming" Wrox Press Inc. ISBN: 186100303X, the contents of which are incorporated by reference.

Design Overview
Block Diagrams

The mark-up language extensible framework is shown schematically in FIG. 1. This is implemented as part of the operating system of a computing device. The Client 1 is the application using the mark-up framework for parsing or generating a document. The Parser 2 and Generator 3 components are plug-ins specific to a mark-up language (e.g. XML or WBXML); they are plug-ins to the extensible framework—i.e. a set of genetic APIs that enable the client 1 to communicate with Parser 2 and Generator 3. The plug-ins conform to Symbian OS requirements known as 'ECOM'.

Because of the framework architecture, many new kinds of parsers and generators (e.g. to handle extensions to mark up languages, new languages or new schemas) can readily be loaded onto the device, even after the device has shipped. Further, different clients running on the device can share the same parser or generator; these clients are simpler than prior art clients since they need to operate with a single, generic API. The API is shown symbolically as the API abstraction or intermediary layer 10. The Parser 2 and Generator 3 components use the Namespace collection 4 to retrieve information about a specific namespace during the parsing or generating phase.

The Namespace Plug-in 5 component is an ECOM plug-in that sets-up all the elements, attributes and attribute values for a namespace. For each namespace used, there must be a plug-in that describes the namespace. The namespace information is stored in a string pool. The string pool is a way of storing strings that makes comparison almost instantaneous at the expense of string creation. It is particularly efficient at handling string constants that are known at compile time, which makes it very suitable for processing documents. Appendix C includes more detail on string pools. The Namespace collection 4 owns the string pool that the Parser 2, Generator 3 and Client 1 can gain access to.

The Namespace Plug-in 5 simply sets-up the string pool with the required strings for the namespace the plug-in represents. The Client 1 may get access to the Namespace Collection 4 via the Parser 2 or Generator 3 to pre-load namespaces prior to parsing or generating documents which may speed up the parsing or generating session.

The Plug-in components (5A-5D) are optional and allow further processing of the data before the client receives it, such as DTD validators or document auto correctors. Validators check the elements and attributes conform to the DTD. Document auto correction plug-ins are used to try to correct errors reported from DTD validators. These components are also plug-ins to the extensible framework and hence share at least some of the same APIs 10 as the Parser 2 and Generator 3. The Parser 2 is event driven and sends events to the various plug-ins and UI during parsing.

Figure 2:
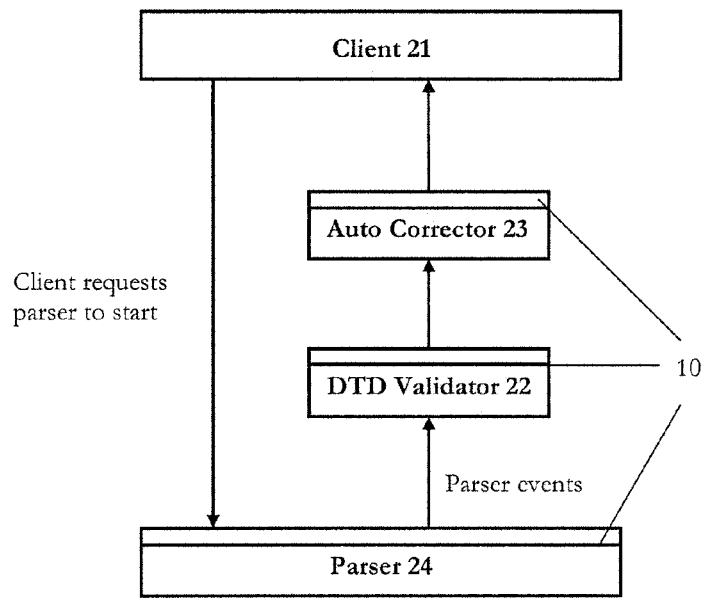
FIG. 2 is a schematic block diagram of a client parsing using a DTD validator and auto-corrector.

FIG. 2 shows a Client 21 parsing with a DTD validator 22 and Auto corrector 23; these components are also plug-ins to the extensible framework and use the same generic interface, again indicated schematically as layer 10. As a consequence, these components will operate with any parser or generator that that is a plug-in the extensible framework. In operation, the Client 21 talks to the Parser 24 directly to start the parse. The Parser 24 sends events to the Plug-ins, 22, 23; they operate using a 'chain of responsibility'. The first plug-in that receives events is the DTD validator plug-in 22. This plug-in validates that the data in the event it received is correct. If it is not correct it will send the same event the Parser 24 sent to the Validator 22 to the Auto corrector 23 except for a error code that will describe the problem the Validator 22 encountered. It the event data is valid the same event will be sent to the Auto corrector 23. Now the Auto corrector 23 receives the event and can check for any errors. If there is an error it can attempt to correct it. If it can correct the error it will modify the data in the event and remove the error code before sending the event to the client. The Client 21 finally receives the event and can now handle it.

Figure 3:
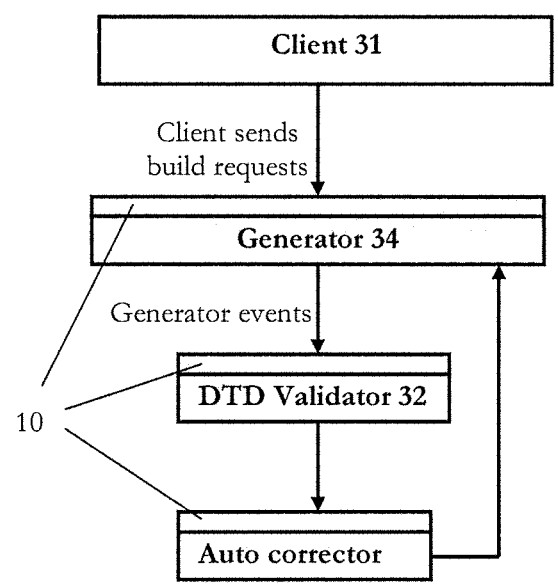
FIG. 3 is a schematic block diagram of a client using a generator with a DTD validator and auto-corrector.

FIG. 3 illustrates a Client 31 generating mark up language using a generator 34 with a DTD validator 32 and Auto corrector plug-in 33. All plug-ins are plug-ins to the extensible framework and hence share at least some of the same APIs, again symbolically shown as API Layer 10. A real client would probably never use a generator and auto corrector since the data the client generates should always be valid, but it is used here to show the flow of events from a generator and any plug-ins attached.

The Client 31 sends a build request to the Generator 34. The first thing the Generator 34 does is to send the request as an event to the DTD validator plug-in 32. The situation is similar to the parser: the DTD validator plug-in 32 validates that the data in the event it received is correct. If it is not correct, it will send the same event the Generator 34 sent to the Validator 32 to the Auto corrector 33 except for an error code that will describe the problem the Validator 32 encountered. It the event data is valid the same event will be sent to the Auto corrector 33. Now the Auto corrector 33 receives the event and can check for any errors. If there is an,error it can attempt to correct it. If it can correct the error it will modify the data in the event and remove the error code before sending the event back to the Generator 34. The major difference between the events during parsing and generating is that with generating, once the final plug-in has dealt with the event it gets sent back to the generator. The generator receives the event and builds up part of the document using the details from the event.

Parsing and Generating WBXML

Parsing WBXML is quite different to parsing XML or HTML. The main difference is elements and attributes are defined as tokens rather than using their text representation. This means a mapping needs to be stored between a WBXML token and its static string representation. The Namespace plug-in for a particular namespace will store these mappings. A WBXML parser and generator can then obtain a string from the namespace plug-in given the WBXML token and vice versa. Appendix C deals with this in more detail.

Class Diagram

Figure 4:
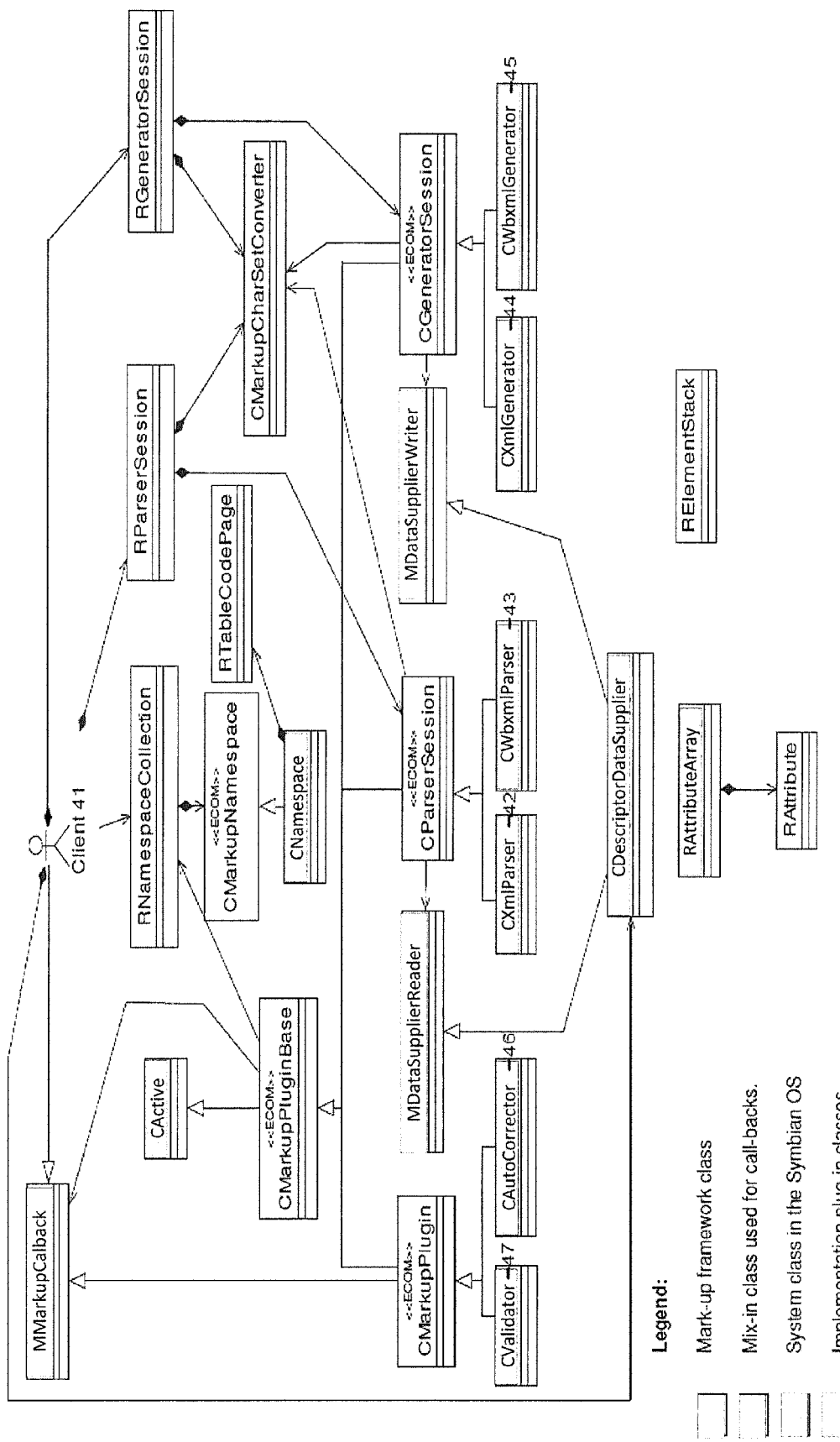
FIG. 4 is a class diagram for the extensible framework.

The class diagram for the mark-up framework is shown in FIG. 4. The diagram also depicts plug-ins that makes use of the framework. The dark grey classes are the plug-ins that provide implementation to the mark-up framework. CxmlParser 42 and CwbxmlParser 43 provide an implementation to parse XML and WBXML documents respectively. In the same way CxmlGenerator 44 and CwbxmlGenerator 45 generate XML and WBXML documents respectively. Cvalidator 47 is a plug-in which will validate the mark-up document during parsing or generating. CautoCorrector 46 is a plug-in that corrects invalid mark-up documents.

When parsing a document and the Client 41 receives events for the start of an element for example (OnStartElementL), the element RString in the event is a handle to a string in the string pool. If this is a known string, i.e. one that has been added by the Namespace Plug-in then the string will be static. Otherwise, if it is an unknown string, the parser will add the string to the string pool as a dynamic string and return a RString with a handle of this string. It is not possible to know if a RString is dynamic or static so the parser or generator that obtains a RString must be sure to close it to ensure any memory is released if the string is dynamic. A client that wishes to use the RString after the event returns to the parser must make a copy of it which will increase the reference count and make sure it is not deleted when the parser closes it. The key to the FIG. 4 shading is as follows:

| NAME | TYPE OF CLASS |
|---|---|
| RNamespaceCollection | Mark-up framework class |
| RParserSession | Mark-up framework class |
| RGeneratorSession | Mark-up framework class |
| CMarkupPluginBase | Mark-up framework class |
| CMarkupNamespace | Mark-up framework class |
| RTableCodePage | Mark-up framework class |
| CMarkupCharSetConverter | Mark-up framework class |
| CMarkupPlugin | Mark-up framework class |
| CParserSession | Mark-up framework class |
| CGeneratorSession | Mark-up framework class |
| RAttribute | Mark-up framework class |
| RElementStack | Mark-up framework class |
| MMarkupCallback | Mix-in class used for call-backs |
| MDataSupplierReader | Mix-in class used for call-backs |
| MDataSupplierWriter | Mix-in class used for call-backs |
| CActive | System class in the Symbian OS |
| RAttributeArray | System class in the Symbian OS |
| CNamespace | Implementation plug-in classes |
| CValidator | Implementation plug-in classes |
| CAutoCorrector | Implementation plug-in classes |
| CXMLParser | Implementation plug-in classes |
| CWbxmlParser | Implementation plug-in classes |

-continued

| NAME | TYPE OF CLASS |
|---|---|
| CXmlGenerator | Implementation plug-in classes |
| CWbxmlGenerator | Implementation plug-in classes |
| CDescriptorDataSupplier | Implementation plug-in classes |

Figure 5:
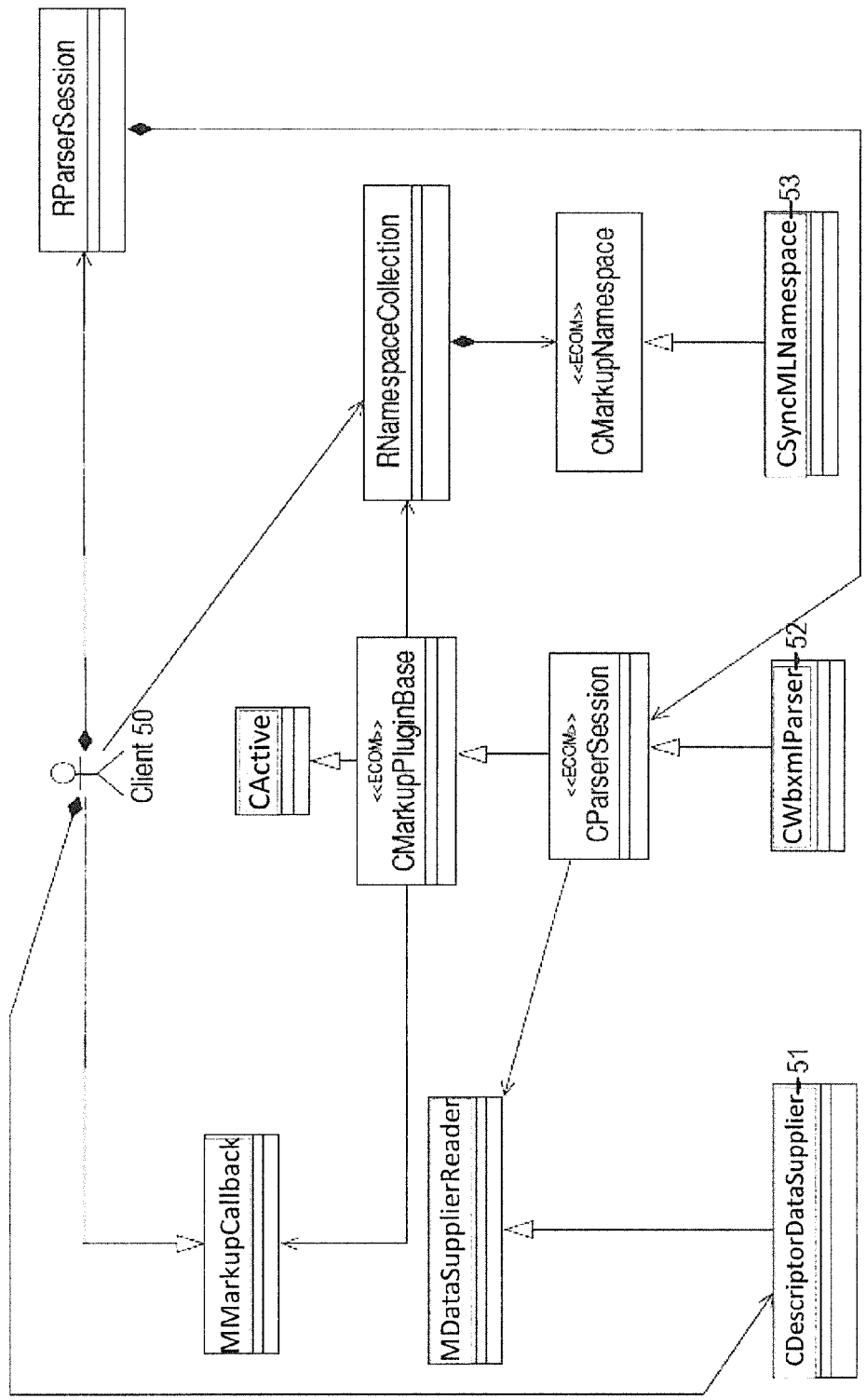
FIG. 5 is a class diagram of a WBXML parser used to parse SyncML.

FIG. 5 is an example class diagram that shows the major classes for parsing WBXML SyncML documents. The client creates a CdescriptorDataSupplier 51 that supplies the data to the parser. CwbxmlParser 52 is the class that actually parses the document. CSyncMLNamespace 53 is the namespace for SyncML that the parser uses to map WBXML tokens to strings. All the other classes belong to the mark-up framework. To parse a document with different namespaces the only thing that needs to be added is a plug-in for each namespace.

The key to the FIG. 5 shading is as follows:

| NAME | TYPE OF CLASS |
|---|---|
| RParserSession | Mark-up framework class |
| CMarkupPluginBase | Mark-up framework class |
| RNamespaceCollection | Mark-up framework class |
| CParserSession | Mark-up framework class |
| CMarkupNamespace | Mark-up framework class |
| MMarkupCallback | Mix-in class used for call-backs |
| MDataSupplierReader | Mix-in class used for call-backs |
| CActive | System class in the Symbian OS |
| CDescriptorDataSupplier | Implementation plug-in classes |
| CWbxmlParser | Implementation plug-in classes |
| CSyncMLNamespace | Implementation plug-in classes |

Class Dictionary

| Object name | Description | Associated (owned/dependant) objects |
|---|---|---|
| MMarkupCallback | A call-back that a client must implement so that the parser can report events back to the client during the parsing session. | Inherited by clients and plug-ins. |
| RNamespaceCollection | Contains a collection of namespaces. Contains reference counter so multiple parsers or generators may use the same namespace collection. | Owned by either CParserSession or CGeneratorSession. Owns an array of CMarkupNamespace plug-ins. |
| CMarkupNamespace | ECOM interface to implement a namespace. | Inherited by any namespace plug-ins. |
| RParserSession | Public interface for a client to create a parser session. | Owned by the client. |
| RGeneratorSession | Public interface for a client to create a generator session. | Owned by the client. |
| CMarkupCharSetConverter | Helper function which uses CCnvCharacterSetConverter for the client, parser and generator to do any character set conversions or resolving MIB Enums or Internet-standard names of character sets. | Owned by RParserSession and RGeneratorSession. |
| CMarkupPluginBase | Generic interface for any type of plug-in. | Inherited by CMarkupPlugin, CParserSession and CGeneratorSession. |

| Object name | Description | Associated (owned/dependant) objects |
|---|---|---|
| CMarkupPlugin | ECOM interface for plug-ins to be used by the parser and generator. | Owned by CParserSession or CGeneratorSession. |
| MDataSupplierReader | Pure virtual interface to be implemented by a data supplier for reading data. | Inherited by the client's data provider. |
| MDataSupplierWriter | Pure virtual interface to be implemented by a data supplier for writing data. | Inherited by the client's data provider. |
| CParserSession | ECOM interface for parser plug-ins. | Inherited by a concrete parser implementation. |
| CGeneratorSession | ECOM interface for generator plug-ins. | Inherited by a concrete generator implementation. |
| RAttribute | Contains the name and value of an attribute. | Used by the parse, generator and client. |
| The classes below are not part of the framework but illustrate how the framework can be used. | | |
| CValidator | A DTD, schema or some other type of validator. | Owned by RParserSession or RGeneratorSession. |
| CAutoCorrector | Used to auto correct invalid data. | Owned by RParserSession or RGeneratorSession. |
| CXmlParser | An XML parser implementation. | Owned by RParserSession. |
| CWbxmlParser | A WBXML parser implementation. | Owned by RParserSession. |
| CXmlGenerator | An XML generator implementation. | Owned by RGeneratorSession. |
| CWbxmlGenerator | A WBXML generator implementation. | Owned by RGeneratorSession. |
| CNamespace | A namespace plug-in to use with a parser and generator. | Owned by RNamespaceCollection. |
| RElementStack | A stack of the currently processed elements during parsing or generating. | Owned by CParserSession and CGeneratorSession. |

Detailed Design
RParserSession
  The following is the public API for this class:

| Method | Description |
|---|---|
| void OpenL( MDataSupplierReader& aReader, const TDesC8& aMarkupMimeType, const TDesC8& aDocumentMimeType, MMarkupCallback& aCallback) | Opens a parser session. aReader is the data supplier reader to use during parsing. aMarkupMimeType is the MIME type of the parser to open. aDocumentMimeType is the MIME type of the document to parse. aCallback is a reference to the call-back so the parser can report events. |
| void OpenL( MDataSupplierReader& aReader, const TDesC8& aMarkupMimeType, const TDesC8& aDocumentMimeType, MMarkupCallback& aCallback, RMarkupPlugins aPlugins) | Opens a parser session. aReader is the data supplier reader to use during parsing. aMarkupMimeType is the MIME type of the parser to open. aDocumentMimeType is the MIME type of the document to parse. aCallback is a reference to the call-back so the parser can report events. aPlugins is an array of plug-ins to use with the parser. The first plug-in in the list is the first plug-in to be called back from the parser. The first plug-in will then call-back to the second plug-in etc. |

-continued

| Method | Description |
|---|---|
| void OpenL(<br>MDataSupplierReader& aReader,<br>const TDesC8&<br>aMarkupMimeType,<br>const TDesC8&<br>aDocumentMimeType,<br>MMarkupCallback& aCallback,<br>RMarkupPlugins aPlugins[ ],<br>RNamespaceCollection<br>aNamespaceCollection) | Opens a parser session.<br>aReader is the data supplier reader to use during parsing.<br>aMarkupMimeType is the MIME type of the parser to open.<br>aDocumentMimeType is the MIME type of the document to parse.<br>aCallback is a reference to the call-back so the parser can report events.<br>aPlugins is an array of plug-ins to use with the parser. The first plug-in in the list is the first plug-in to be called back from the parser. The first plug-in will then call-back to the second plug-in etc.<br>aNamespaceCollection is a handle to a previous namespace collection. This is useful if a generator or another parser session has been created so that same namespace collection can be shared. |
| void Close( ) | Closes the parser session. |
| void Start( ) | Start parsing the document. |
| void Stop( ) | Stop parsing the document. |
| void Reset(<br>MDataSupplierReader& aReader,<br>MMarkupCallback& aCallback) | Resets the parser ready to parse a new document.<br>aReader is the data supplier reader to use during parsing.<br>aCallback is a reference to the call-back so the parser can report events. |
| TInt SetParseMode(<br>TInt aParseMode) | Selects one or more parse modes.<br>aParseMode is one or more of the following:<br>EConvertTagsToLowerCase - Converts elements and attributes to lowercase. This can be used for case-insensitive HTML so that a tag can be matched to a static string in the string pool.<br>EErrorOnUnrecognisedTags - Reports an error when unrecognised tags are found.<br>EReportUnrecognisedTags - Reports unrecognised tags.<br>EReportNamespaces - Reports the namespace.<br>EReportNamespacePrefixes - Reports the namespace prefix.<br>ESendFullContentInOneChunk - Sends all content data for an element in one chunk.<br>EReportNameSpaceMapping - Reports namespace mappings via the DoStartPrefixMapping( ) & DoEndPrefixMapping( ) methods.<br>If this function is not called the default will be:<br>EReportUnrecognisedTags \| EReportNamespaces<br>If the parsing mode is not supported KErrNotSupported is returned. |

RGeneratorSession
The following is the public API for this class:

| Method | Description |
|---|---|
| void OpenL(<br>MDataSupplierWriter& aWriter,<br>TUid aMarkupMimeType,<br>const TDesC8&<br>aDocumentMimeType) | Opens a generator session.<br>aWriter is the data supplier writer used to generate a document.<br>aMarkupMimeType is the MIME type of the generator to open.<br>aDocumentMimeType is the MIME type of the document to parse. |
| void OpenL(<br>MDataSupplierWriter& aWriter,<br>TUid aMarkupMimeType,<br>const TDesC8&<br>aDocumentMimeType, | Opens a generator session.<br>aWriter is the data supplier writer used to generate a document.<br>aMarkupMimeType is the MIME type of the generator to open. |

| Method | Description |
| --- | --- |
| RMarkupPlugins aPlugins[ ]) | aDocumentMimeType is the MIME type of the document to parse.<br>aPlugins is an array of plug-ins to use with the generator. |
| void OpenL(<br>MDataSupplierWriter& aWriter,<br>TUid aMarkupMimeType,<br>const TDesC8&<br>aDocumentMimeType,<br>RMarkupPlugins aPlugins[ ],<br>RNamespaceCollection<br>aNamespaceCollection) | Opens a generator session.<br>aWriter is the data supplier writer used to generate a document.<br>aMarkupMimeType is the MIME type of the generator to open.<br>aDocumentMimeType is the MIME type of the document to parse.<br>aPlugins is an array of plug-ins to use with the generator.<br>aNamespaceCollection is a handle to a previous namespace collection. This is useful if a generator or another parser session has been created so that same namespace collection can be shared. |
| void Close( ) | Closes the generator session. |
| void Reset(<br>MDataSupplierWriter& aWriter,<br>MMarkupCallback& aCallback) | Resets the generator ready to generate a new document.<br>aWriter is the data supplier writer used to generate a document.<br>aCallback is a reference to the call-back so the generator can report events. |
| void BuildStartDocumentL(<br>RDocumentParameters<br>aDocParam); | Builds the start of the document.<br>aDocParam specifies the various parameters of the document. In the case of WBXML this would state the public ID and string table. |
| void BuildEndDocumentL( ) | Builds the end of the document. |
| void BuildStartElementL(<br>RTagInfo& aElement,<br>RAttributeArray& aAttributes) | Builds the start element with attributes and namespace if specified.<br>aElement is a handle to the element's details.<br>aAttributes contains the attributes for the element. |
| void BuildEndElementL(<br>RTagInfo& aElement) | Builds the end of the element.<br>aElement is a handle to the element's details. |
| void BuildContentL(<br>const TDesC8& aContentPart) | Builds part or all of the content. Large content should be built in chunks. I.e. this function should be called many times for each chunk.<br>aBytes is the raw content data. This data must be converted to the correct character set by the client. |
| void BuildPrefixMappingL(<br>RString& aPrefix,<br>RString& aUri) | Builds a prefix - URI namespace for the next element to be built. This method can be called for each namespace that needs to be declared.<br>aPrefix is the Namespace prefix being declared.<br>aUri is the Namespace URI the prefix is mapped to. |
| void BuildProcessingInstructionL(<br>RString& aTarget,<br>RString& aData) | Build a processing instruction.<br>aTarget is the processing instruction target.<br>aData is the processing instruction data. |

RTagInfo

The following is the public API for this class:

| Method | Description |
| --- | --- |
| void Open(<br>RString& aUri,<br>RString& aPrefix,<br>RString& aLocalName) | Sets the tag information for an element or attribute.<br>aUri is the URI of the namespace.<br>aPrefix is the prefix of the qualified name.<br>aLocalName is the local name of the qualified name. |
| void Close( ) | Closes the tag information. |
| RString& Uri( ) | Returns the URI. |
| RString& LocalName( ) | Returns the local name. |
| RString& Prefix( ) | Returns the prefix. |

RNamespaceCollection

The following is the public API for this class:

| Method | Description |
| --- | --- |
| void Connect( ) | Every time this method is called a reference counter is incremented so that the namespace collection is only destroyed when no clients are using it. |

-continued

| Method | Description |
| --- | --- |
| void Close( ) | Every time this method is called a reference counter is decremented and the object is destroyed only when the reference counter is zero. |
| const CMarkupNameSpace& OpenNamespaceL( const TDesC8& aMimeType) | Opens a namespace plug-in and returns a reference to the namespace plug-in. If the namespace plug-in is not loaded it will be automatically loaded. aMimeType is the MIME type of the plug-in to open. |
| const CMarkupNameSpace& OpenNamespaceL( TUint8 aCodePage) | Opens a namespace plug-in and returns a reference to the namespace plug-in. aCodePage is the code page of the plug-in to open. |
| void Reset( ) | Resets the namespace collection and string pool. |
| RStringPool StringPool( ) | Returns a handle to the string pool object. |

CMarkupNamespace
    The following is the API for this class:

| Method | Description |
| --- | --- |
| void NewL(RStringPool aStringPool) | Creates the namespace plug-in. aStringPool is a handle of the string pool to add static string tables. |
| RString& Element( TUint8 aWbxmlToken) const | Returns a handle to the string. aWbxmlToken is the WBXML token of the element. |
| void AttributeValuePair( TUint8 aWbxmlToken RString& aAttribute, RString& aValue) const | Returns a handle to the attribute and value strings. aWbxmlToken is the WBXML token of the attribute. aAttribute is the handle to the attribute string. aValue is the handle to the value string. |
| RString& AttributeValue( TUint8 aWbxmlToken) const | Returns a handle to an attribute value. aWbxmlToken is the WBXML token of the attribute. |
| RString& NamespaceUri( ) const | Returns the namespace name. |
| TUint8 CodePage( ) const | Returns the code page for this namespace. |

RTableCodePage
    The following is the API for this class:

| Method | Description |
| --- | --- |
| RString NameSpaceUri( ) | Returns the namespace URI for this code page. |
| TInt StringPoolIndexFromToken( TInt aToken); | Gets a StringPool index from a token value. −1 is returned if the item is not found. |

-continued

| Method | Description |
| --- | --- |
| TInt TokenFromStringPoolIndex( TInt aIndex); | Gets a token value from a StringPool index. −1 is returned if the item is not found. |

CMarkupPluginBase
    The following is the API for this ECOM class:

| Method | Description |
| --- | --- |
| CMarkupPluginBase& RootPlugin( ) | Returns a reference to the root plug-in. This must be either a parser or generator plug-in. |
| CMarkupPluginBase& ParentPlugin( ) | Returns a reference to the Parent plug-in. |
| RElementStack& ElementStack( ) | Returns a handle to the element stack. |
| RNameSpaceCollection& NamespaceCollection( ) | Returns a handle to the namespace collection. |
| CMarkupCharSetConverter& CharSetConverter( ) | Returns a reference to the character set converter object. |
| TBool IsChildElementValid( RString& aParentElement, RString& aChildElement) | Checks if the aChildElement is a valid child of aParentElement. |

CMartkupPlugin
The following is the API for this ECOM class:

| Method | Description |
| --- | --- |
| CMarkupPlugin* NewL (MMarkupCallback& aCallback) | Creates an instance of a mark-up plug-in. aCallback is a reference to the call-back to report events. |
| void SetParent( | Sets the parent plug-in for this plug-in. |
| CMarkupPluginBase* aParentPlugin) | aParentPlugin is a pointer to the parent plug-in or NULL if there is no parent. A parser or generator does not have a parent so this must not be set, as the default NULL will indication there is not parent. |

CParserSession
The following is the API for this ECOM class:

| Method | Description |
| --- | --- |
| CParserSession* NewL( MDataSupplierReader& aReader, const TDesC8& aMarkupMimeType, const TDesC8& aDocumentMimeType, MMarkupCallback& aCallback, RNamespaceCollection* aNamespaceCollection, CMarkupCharSetConverter& aCharSetConverter) | Opens a parser session. aReader is the data supplier reader to use during parsing. aMarkupMimeType is the MIME type of the parser to open. aDocumentMimeType is the MIME type of the document to parse. aCallback is a reference to the call-back so the parser can report events. aNamespaceCollection is a handle to a previous namespace collection. Set to NULL if a new RNamespaceCollection is to be used. aCharSetConverter is a reference to the character set conversion class. |
| void Start( ) | Start parsing the document. |
| void Stop( ) | Stop parsing the document. |
| void Reset( MDataSupplierReader& aReader, MMarkupCallback& aCallback) | Resets the parser ready to parse a new document. aReader is the data supplier reader to use during parsing. aCallback is a reference to the call-back so the parser can report events. |
| void SetParseMode( TInt aParseMode) | Selects one or more parse modes. See RParserSession for details on aParseMode. |

CGeneratorSession
The following is the API for this ECOM class:

| Method | Description |
| --- | --- |
| void OpenL( MDataSupplierWriter& aWriter, TUid aMarkupMimeType, const TDesC8& aDocumentMimeType, MMarkupCallback& aCallback, RNamespaceCollection* aNamespaceCollection, CMarkupCharSetConverter& aCharSetConverter) | Opens a generator session. aWriter is the data supplier writer used to generate a document. aMarkupMimeType is the MIME type of the generator to open. aDocumentMimeType is the MIME type of the document to parse. aCallback is a reference to the call-back so the generator can report events. aNamespaceCollection is a handle to a previous namespace collection. Set to NULL if a new RNamespaceCollection is to be used. aCharSetConverter is a reference to the character set conversion class. |
| void Reset( MDataSupplierWriter& aWriter, MMarkupCallback& aCallback) | Resets the generator ready to generate a new document. aWriter is the data supplier writer used to generate a document. aCallback is a reference to the call-back so the generator can report events. |
| void BuildStartDocumentL( RDocumentParameters aDocParam); | Builds the start of the document. aDocParam specifies the various parameters of the document. |
| void BuildEndDocumentL( ) | Builds the end of the document. |
| void BuildStartElementL( RTagInfo& aElement, RAttributeArray& aAttributes) | Builds the start element with attributes and namespace if specified. aElement is a handle to the element's details. aAttributes contains the attributes for the element. |

-continued

| Method | Description |
|---|---|
| void BuildEndElementL( RTagInfo& aElement) | Builds the end of the element. aElement is a handle to the element's details. |
| void BuildContentL( const TDesC8& aContentPart) | Builds part or all of the content. Large content should be built in chunks. I.e. this function should be called many times for each chunk. aBytes is the raw content data. This data must be converted to the correct character set by the client. |
| void BuildProcessingInstructionL( RString& aTarget, RString& aData) | Build a processing instruction. aTarget is the processing instruction target. aData is the processing instruction data. |

RAttribute
The following is the API for this class:

| Method | Description |
|---|---|
| RTagInfo& Attribute( ) | Returns a handle to the attribute's name details. |
| TAttributeType Type( ) | Returns the attribute's type. Where TAttributeType is one of the following enumeration: CDATA ID IDREF IDREFS NMTOKEN NMTOKENS ENTITY ENTITIES NOTATION |
| RString& Value( ) | Returns a handle to the attribute value. If the attribute value is a list of tokens (IDREFS, ENTITIES or NMTOKENS), the tokens will be concatenated into a single RString with each token separated by a single space. |

MDataSupplierReader
The following is the API for this mix-in class:

| Method | Description |
|---|---|
| TUint8 GetByteL( ) | Get a single byte from the data supplier. |
| const TDesC8& GetBytesL( TInt aNumberOfBytes) | Gets a descriptor of size aNumberOfChars. If the number of bytes is not available this method leaves with KErrEof. The returned descriptor must not be deleted until another call to GetBytesL or EndTransactionL( ) is made. |
| void StartTransactionL( ) | The parser calls this to indicate the start of a transaction. |
| void EndTrasactionL( ) | The parser calls this to indicate the transaction has ended. Any data stored for the transaction may now be deleted. |
| void RollbackL( ) | The parse calls this to indicate the transaction must be rolled back to the exact state as when StartTransactionL( ) was called. |

MDataSupplierWriter
The following is the API for this mix-in class:

| Method | Description |
|---|---|
| void PutByteL( TUint8 aByte) | Put a byte in the data supplier. |
| void PutBytesL( const TDesC8& aBytes) | Puts a descriptor in the data supplier. |

MMarkupCallback
The following is the API for this mix-in class:

| Method | Description |
|---|---|
| void OnStartDocumentL( RDocumentParameters aDocParam, TInt aErrorCode); | Callback to indicate the start of the document. aDocParam specifies the various parameters of the document. aErrorCode is the error code. If this is not KErrNone then special action may be required. |

-continued

| Method | Description |
| --- | --- |
| void OnEndDocumentL(<br>TInt aErrorCode); | Indicates the end of the document has been reached.<br>aErrorCode is the error code. If this is not KErrNone then special action may be required. |
| void OnStartElementL(<br>RTagInfo& aElement,<br>RAttributeArray& aAttributes,<br>TInt aErrorCode); | Callback to indicate an element has been parsed.<br>aElement is a handle to the element's details.<br>aAttributes contains the attributes for the element.<br>aErrorCode is the error code. If this is not KErrNone then special action may be required. |
| void OnEndElementL(<br>RTagInfo& aElement,<br>TInt aErrorCode); | Callback to indicate the end of the element has been reached.<br>aElement is a handle to the element's details.<br>aErrorCode is the error code. If this is not KErrNone then special action may be required. |
| void OnContentL(<br>const TDesC8& aBytes,<br>TInt aErrorCode) | Sends the content of the element. Not all the content may be returned in one go. The data may be sent in chunks. When an OnEndElementL is received this means there is no more content to be sent.<br>aBytes is the raw content data for the element. The client is responsible for converting the data to the required character set if necessary. In some instances with WBXML opaque data the content may be binary and must not be converted.<br>aErrorCode is the error code. If this is not KErrNone then special action may be required. |
| void OnStartPrefixMappingL(<br>RString& aPrefix,<br>RString& aUri,<br>TInt aErrorCode) | Notification of the beginning of the scope of a prefix-URI Namespace mapping. This method is always called before the corresponding OnStartElementL method.<br>aPrefix is the Namespace prefix being declared.<br>aUri is the Namespace URI the prefix is mapped to.<br>aErrorCode is the error code. If this is not KErrNone then special action may be required. |
| void OnEndPrefixMappingL(<br>RString& aPrefix,<br>TInt aErrorCode) | Notification of the end of the scope of a prefix-URI mapping. This method is called after the corresponding DoEndElementL method.<br>aPrefix is the Namespace prefix that was mapped.<br>aErrorCode is the error code. If this is not KErrNone then special action may be required. |
| void OnIgnoreableWhiteSpaceL(<br>const TDesC8& aBytes,<br>TInt aErrorCode) | Notification of ignorable whitespace in element content.<br>aBytes are the ignored bytes from the document being parsed.<br>aErrorCode is the error code. If this is not KErrNone then special action may be required. |
| void OnSkippedEntityL(<br>RString& aName,<br>TInt aErrorCode) | Notification of a skipped entity. If the parser encounters an external entity it does not need to expand it —it can return the entity as aName for the client to deal with.<br>aName is the name of the skipped entity.<br>aErrorCode is the error code. If this is not KErrNone then special action may be required. |
| void OnProcessingInstructionL(<br>const TDesC8& aTarget,<br>const TDesC8& aData,<br>TInt aErrorCode) | Receive notification of a processing instruction.<br>aTarget is the processing instruction target.<br>aData is the processing instruction data. If empty none was supplied.<br>aErrorCode is the error code. If this is not KErrNone then special action may be required. |
| void OnOutOfDataL( ) | There is no more data in the data supplier to parse. If there is more data to parse Start( ) should be called once there is more data in the supplier to continue parsing. |
| void OnError(TInt aError) | An error has occurred where aError is the error code |

Sequence Diagrams
Setting Up, Parsing and Generating

Figure 6:
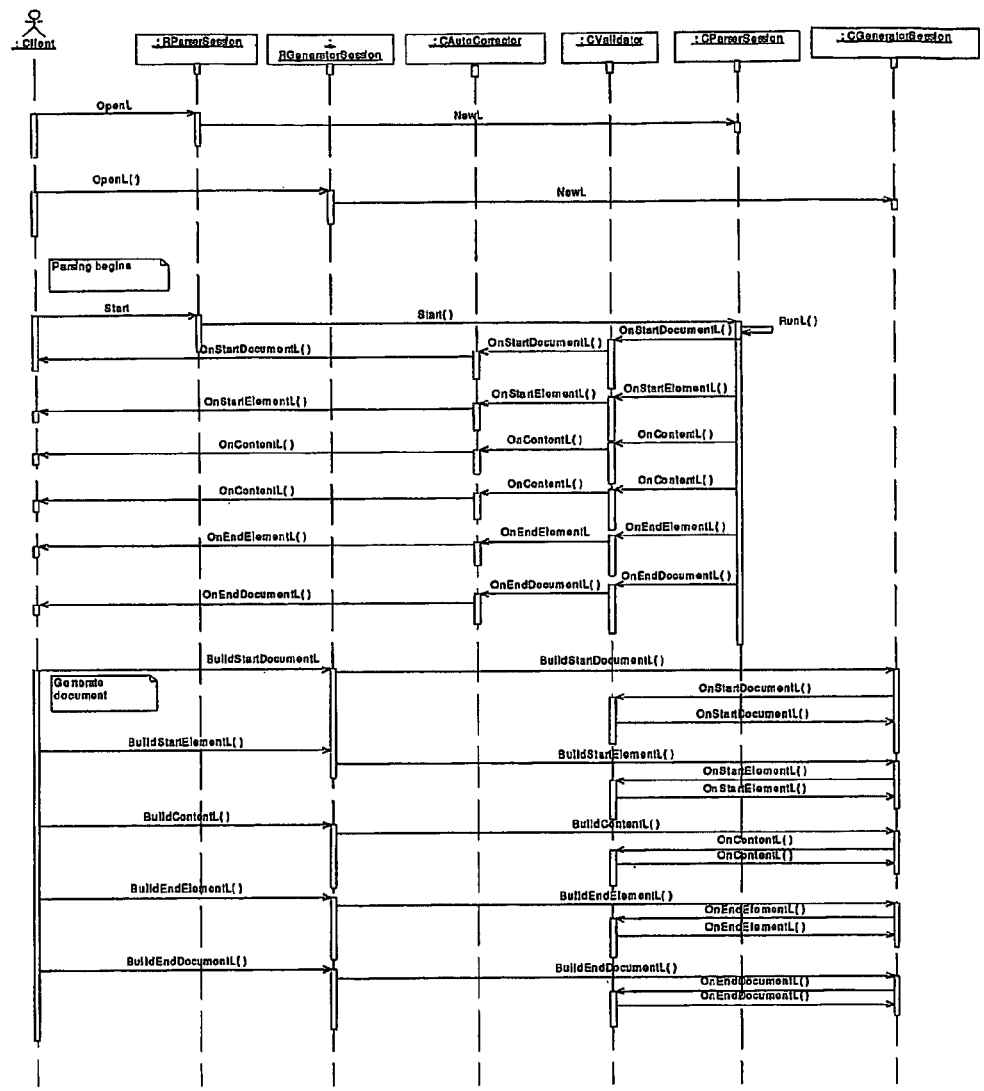
FIG. 6 is a sequence diagram for a parser and generator session.

FIG. 6 shows the interaction of the client with the various parser objects to create a parser and generator session. The parsing of a simple document with only one element and generation of one element is shown. It is assumed a DTD validator and auto correct component are used. Auto correction in this example is only used with the parser. The generator only checks that tags are DTD compliant but does not try to correct any DTD errors.

Element Not Valid at Current Level in DTD

Figure 7:
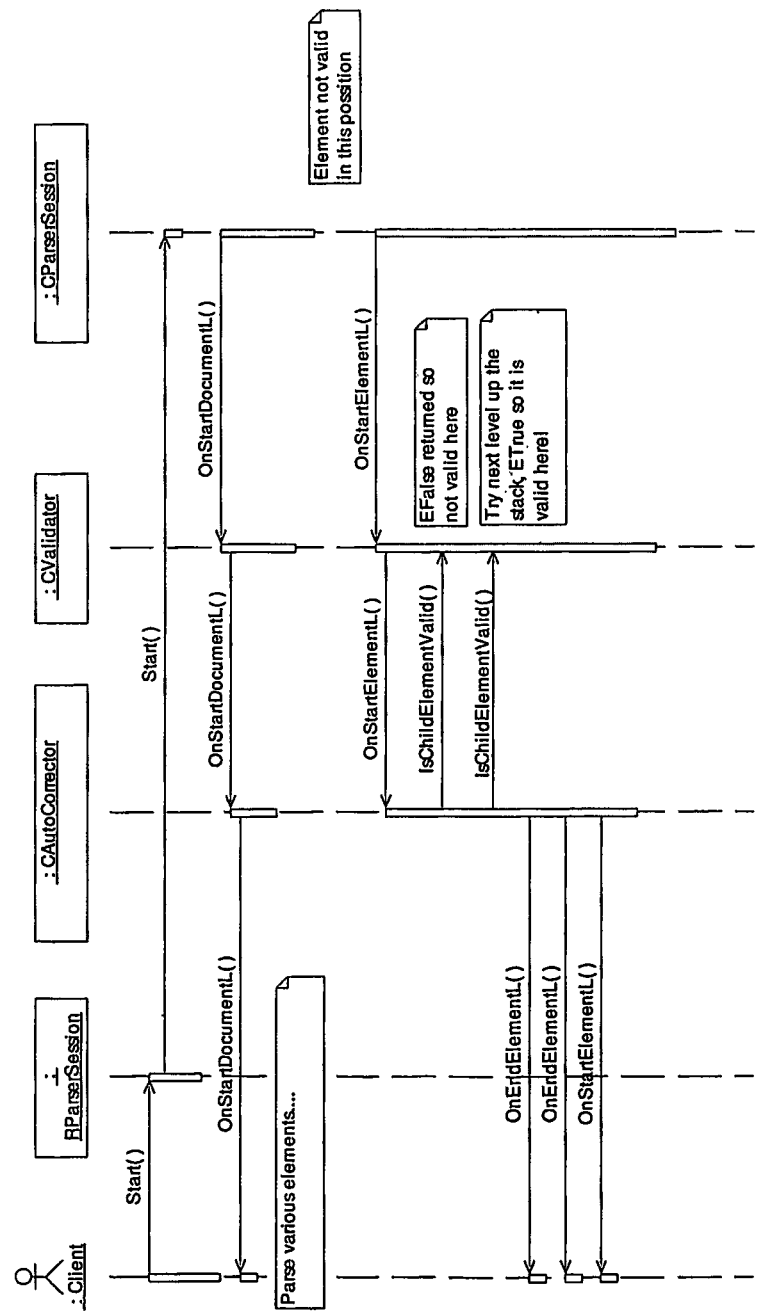
FIG. 7 is a sequence diagram showing DID validation and auto-correction.

Auto correction is left up to the plugin implementers to decide how and what should be corrected. The sequence diagram in FIG. 7 shows an example of what is possible with the case where the format of the document is valid, however, there is a invalid element (C) that should be at a different level as shown in an example document below:

```
<A>Content
    <B>
        <C> // Not valid for the DTD, should be a root element.
        Some content
        </C>
    </B>
</A>
// <C> should go here
```

The bad element is detected by the DTD validator and sent to the auto correct component. The auto corrector realises that this element has an error from the error code passed in the call-back and tries to find out where the element should go, and send back the appropriate OnEndElementL( ) call-backs to the client.

Scenarios

Set-up a parser to parse WBXML without any plug-ins. Scenario to parse the following document:

```
<A>
    <B>
    Content
    </B>
<A>
```

1. The client creates a data supplier that contains the data to be parsed.
2. The client creates an RParserSession passing in the data supplier, MIME type for WBXML, the MIME type of the document to be parsed and the call-back pointer where parsing events are to be received.
3. The client begins the parsing by calling Start( ) on the parser session.
4. The parser makes the following call-backs to the client:
   OnStartDocument( )
   OnStartElementL('A')
   OnStartElementL('B')
   OnContent('Content')
   OnEndElementL('B')
   OnEndElementL('A')
   OnEndDocumentL( )

Set-Up a Parser to Parse WBXML with a Validator Plug-In

The same document as 5.1 is used in this scenario.

1. The client creates a data supplier that contains the data to be parsed.
2. The client constructs a RMarkupPlugins object with the UID of a validator.
3. The client creates an RParserSession passing in the data supplier, MIME type for WBXML, the MIME type of the document to be parsed, call-back pointer where parsing events are to be received and the array of plug-ins object.
4. The parser session first iterates through the array of plug-ins starting from the end of the list. It creates the CValidator ECOM object setting the call back to the client. The CWbxmlParser ECOM object is created next and its call-back is set to the CValidator object. This sets up the chain of call-back events from the parser through to the validator and then the client. The validator needs access to data from the parser so SetParent needs to be called on all the plug-ins in the array. The validator sets its parent to the parser object.
5. The client begins the parsing by calling Start( ) on the parser session.
6. The parser makes the following call-backs to the client:
   OnStartDocumentL( )
   OnStartElementL('A')
   OnStartElementL('B')
   OnContent('Content')
   OnEndElementL('B')
   OnEndElementL('A')
   OnEndDocumentL( )

Generating a WBXML Document with a DTD Validator

The document in 5.1 is to be generated in this scenario.

1. The client creates a data supplier with an empty buffer.
2. The client constructs a RMarkupPlugins object with the UID of a validator.
3. The client creates a RParserGenerator passing in the data supplier, MIME type for WBXML, MIME type of the document to be parsed and the array of plug-ins object.
4. The generator session first iterates through the array of plug-ins starting from the end of the list. It creates the CValidator ECOM object setting the call back to the client. The CWbxmlGenerator ECOM object is created next and its call-back is set to the CValidator object. This sets up the chain of call-back events from the generator through to the validator and then the client. The validator needs access to data from the parser so SetParent needs to be called on all the plug-ins in the array. The validator sets its parent to the parser object.
5. The client then calls the following methods:
   BuildStartDocumentL( )
   BuildStartElementL('A')
   BuildStartElementL('B')
   BuildContentL('Content')
   BuildEndElementL('B')
   BuildEndElementL('A')

Design Consideration

ROM/RAM Memory Strategy—the string pool is used to mininise duplicate strings. Error condition handling—errors are returned back to plug-ins and the client via the call-back API.

Localisation issues—documents can use any character set and the character set is returned back to the client in the case of parsing so it knows how to deal with the data. For a generator the client can set the character set of the document.

Performance considerations—the string pool makes string comparisons efficient.

Platform Security—in normal usage the parser and generator do not need any capabilities. However, if a plug-in were designed to load a DTD from the Internet it would require PhoneNetwork capabilities.

Modularity—all components in the framework are ECOM components that can be replaced or added to in the future.

Testing

The data supplier and parser generator set-up components can be tested individually—all the functions are synchronous and therefore no active objects need to be created for testing.

The following steps can be carried out to test parsing and generation of WBXML or XML:
1. Load a pre-created file.
2. Parse the file.
3. Generate a buffer from the output of the parser.
4. Compare the output of the buffer with the original pre-created file to see if they match.

Additional tests are carried out to test error conditions of parsing, such as badly formatted documents and corrupt documents.

Glossary

The following technical terms and abbreviations are used within this document.

| Term | Definition |
| --- | --- |
| XML | Extensible Markup Language |
| WBXML | WAP Binary Extensible Markup Language |
| SAX | Simple API for XML |
| DOM | Document Object Model |
| Element | This is a tag enclosed by angle brackets. E.g <Name>, <Address>, <Phone> etc |

| Term | Definition |
|---|---|
| Attributes | These are the attributes associated with an element. E.g. <Phone Type="Mobile"> The attribute here is "Type". |
| Values | These are the actual value of an attribute. E.g. <Phone Type="Mobile"> The value here is "Mobile" |
| Content | This is the actual content for an element. E.g. <Name>Symbian</Name>. Here "Symbian" is the content for the element "Name". |
| DTD | Document Type Definition |
| MIME | Multipurpose Internet Mail Extensions |
| Code Page | Since only 32 elements can be defined In WBXML, code pages are created so that each code page can have 32 elements. |
| XSLT | Extensible Style-sheet Language Transformations |
| SOAP | Simple Object Access Protocol |
| URI | Uniform Resource Identifiers |
| qualified name | A qualified name specifies a prefix: local name e.g. 'HTML:B' |
| prefix | From the qualified name example this is 'HTML' |
| local name | From the qualified name example this is 'B' |

Appendix A—<Auto Correction Examples>

Table A1 shows a situation where the end tags are the wrong way round for A and B. This is very easy to fix since the DTD validator keeps a stack of the tags, it knows what the end tag should be.

TABLE A1

End tags that are the wrong way round

```
<A>Content
    <B>
    More content
    </A>
</B>
```

Table A2 shows the situation where the B end tag is missing. Since the end tag does not match a guess can be made that there should be an end tag for B before the end tag of A.

TABLE A2

Missing end tag

```
<A>Content
    <B>
    More content
</A>
```

Table A3 shows the situation where there are no end tags for A and B. The DTD validator will detect the problem and send an end tag for B to the client. The auto correct component will query the DTD validator if the C tag is valid for the parent element A. If it is valid a OnStartELementL( ) will be sent to the client, otherwise the auto correct component can check further up the element stack to find where this element is valid. If it is not valid anywhere in the stack then it will be ignored together with any content and end element tag.

TABLE A3

Missing end tags

```
<A>Content
    <B>
    More content
    <C>
    Some content
    </C>
```

Appendix B—How to Write a Namespace Plug-In

The tables below show the WBXML tokens for the example namespace. Tables 1 to 3 each represent a static string table. Tables 1 shows the elements for code page 0. Tables 2 and 3 are for attribute value pairs respectively. Each attribute index on Table 2 refers to the values of the same index in Table 3. These token values must match up in Tables 2 and 3. If an attribute does not have a value then there must be a blank as shown in Table 3 with token 8. For attribute values, these also appear in Table 3 but have a WBXML token value of 128 or greater.

TABLE 1

ElementTable0, code page 0

| Element type name | WBXML token |
|---|---|
| Addr | 5 |
| AddType | 6 |
| Auth | 7 |
| AuthLevel | 8 |

TABLE 2

AttributeValuePairNameTable, code page 0

| Attribute name/value pair (attribute part) | WBXML token |
|---|---|
| TYPE | 6 |
| TYPE | 7 |
| NAME | 8 |
| NAME | 9 |

TABLE 3

AttributeValuePairValueTable, code page 0

| Attribute name/value pair (value part) | WBXML token |
|---|---|
| ADDRESS | 6 |
| URL | 7 |
|  | 8 |
| BEARER | 9 |
| GSM/CSD | 128 |
| GSM/SMS | 129 |
| GSM/USSD | 130 |

The following string table files (.st) are created for each table:

String table for Table 1

```
# Element table for code page 0
stringtable ElementCodePage0
EAddr Addr
EAddType AddType
EAuth Auth
EAuthLevel AuthLevel
```

| String table for Table 2 |
|---|
| # Attributes table for code page 0 |
| stringtable AttributesCodePage0 |
| EType Type |
| EType Type |
| EName Name |
| EName Name |

| String Table for Table 3 |
|---|
| # Attribute values table for code page 0 |
| stringtable AttributeValuesCodePage0 |
| EAddress Address |
| EURL URL |
| EBearer BEARER |
| EGSM_CSD GSM/CSD |
| EGSM_SMS GSM/SMS |
| EGSM_USSD GSM/USSD |

<Example Usage of API>
Below shows an example of how to setting up the parser and generator with DTD checking and auto correction.
```
RMarkupPlugins plugins;
plugins.Append(KMyValidator);
plugins.Append(KMyAutoCorrectot};
CDescriptorDataSupplier*dataSupplier=
    CDescriptorDataSupplier::NewLC( );
RParserSession parser;
parser.OpenL(dataSupplier, MarkupMimeType, Document-
    MimeType, callback, plugins);
parser.Parse( );
// Callback events will be received
parser.Close( );
// Now construct a generator using the same plug-ins and data
    supplier
RGeneratorSession generator;
generator.OpenL(dataSupplier, MarkupMimeType, Docu-
    mentMimeType, callback, plugins);
generator.BuildStartDocumentL( );
RAttributeArray attributes;
// Get an RString from the ElementStringTable
RString  string=generator.StringPool(   ).String(Element-
    StringTable::Tag1, ElementStringTable);
// Build one element with content
generator.BuildStartElementL(string, attributes);
generator.BuildContentL(_L8("This is the content"));
generator.BuildEndElementL(string);
generator.BuildEndDocumentL( );
generator.Close( );
```
Appendix C
How the String Pool is Used to Parse Both Text and Binary Mark-Up Language The Mark-up Language framework design relies on the fact that it is possible (using the 'String Pool' techniques described below, although other mapping techniques can also be used) to provide the same interface to clients no matter if text or binary mark-up language is used.

Text based mark up languages use strings, i.e. sequences of characters or binary data. In the String Pool technique, static tables of these strings are created at compile time, with one string table per namespace, for all the elements, attributes and attribute values needed to describe a particular type of mark-up document. Each element, attribute and attribute value is assigned an integer number and these integer 'handles' form an index of the strings. A string in an XML document can be rapidly compared to all strings in the string table by the efficient process of comparing the integer representation of the string with all of the integer handles in the static string table. The main benefit of using a string pool for parsing is therefore that it makes it very easy and efficient for the client to check for what is being parsed, since handles to strings are used instead of actual strings. This means only integers are compared rather than many characters, as would be the normal case if string pools were not used. Also, comparisons can be carried out in a simple switch statement in the code, making the code efficient, and easier to read and maintain. Hence, the string pool is used to make string comparisons efficient at the expense of creation of the strings.

For binary mark-up language (e.g. WBXML) the situation is more complex since there are no strings in WBXML. In WBXML, everything is tokenised (i.e. given a token number). We get around the absence of strings as follows: a table of mappings of each of the WBXML tokens to the index of the string in the string table is created (see FIG. 8). Each mapping is given a unique integer value—a handle. Since it is required to map from tokens to strings and vice versa, two lists of integer value handles are created: one indexed on tokens and the other indexed on the index of the position in the string table. This is so that it is quick to map from one type to the other. All this is encapsulated in the namespace plug-in and therefore is insulated from the client, parser and generator. The client can therefore parse a binary or text document without having to know about the specific format—it simply uses the integer handle (RString), which will work correctly for both text and binary mark-up languages.

The invention claimed is:

1. An apparatus comprising a computing device comprising a memory that stores an extensible framework, the extensible framework configuring the computing device to:
    accept one or more mark-up language parsers or generators, each implemented as plug-ins to the extensible framework, wherein different plug-ins configure the computing device to handle different kinds of markup languages; and
    enable the one or more mark-up language parsers or generators to access components to validate, pre-filter or alter data, in which the components are plug-in components to the extensible framework and configure the computing device to operate using a chain of responsibility design pattern, and wherein the one or more mark-up language parsers or generators uses a namespace collection to retrieve information about a specific namespace during the parsing or generating phrase;
    wherein the computing device is further programmed with a generic data supplier application programming interface (API) and wherein said one or more parsers or generators configure the computing device to access data from said data supplier API;
    wherein said generic data supplier API configures the computing device to access data from at least one data source and wherein, via the generic data supplier API, the extensible framework insulates said one or more parsers or generators from direct communication with said at least one data source; and
    wherein the one or more mark-up language parsers or generators configures the computing device to notify a validator plug-in of elements being parsed and these in turn go to an auto correction plug-in to be fixed if required and finally a client receives these events.

2. The apparatus of claim 1 in which the extensible framework (i) insulates a client running on the device from having to communicate directly with at least one of the one or more parsers or generators and (ii) is generic in that it presents a common API to the client irrespective of the specific kind of parser or generator deployed.

3. The apparatus of claim 1 in which a client interacts with several kinds of parser or generator plug-ins to the extensible framework, each handling different mark-up language formats.

4. The apparatus of claim 1, wherein the computing device is programmed with a file conversion capability requiring (i) a source file to be parsed by the parser, which is adapted to handle one format and (ii) an output, converted file to be generated by one or more of the generators, adapted to handle a different file format.

5. The apparatus of claim 1 in which several different clients are able to share the same parsers or generators.

6. The apparatus of claim 1 in which the extensible framework enables at least the one of the one or more parsers or generators to access data from any source that conforms to the generic data supplier API.

7. The apparatus of claim 6 in which the source is a buffer in memory.

8. The apparatus of claim 6 in which the source is a file.

9. The apparatus of claim 6 in which the source is a socket outputting streaming data.

10. The apparatus of claim 6 in which the computing device is configured to use a data source different from any data sources which the device was capable of using when first operated by an end-user.

11. The apparatus of claim 1 in which the plug-in components configure the computing device to present a common, generic API to the one of the one or more parsers or generators, enabling the same plug-in components to be used with different types of parsers and generators.

12. The apparatus of claim 1 in which the plug-in components configure the computing device to present a common, generic API to a client component using the one of the one or more parsers or generators, enabling the same plug-in components to be used by different clients.

13. The apparatus of claim 1 in which a parsed element stack is made available to all validation/pre-filter/altering plug-ins.

14. The apparatus of claim 1 in which the computing device incorporates a character conversion module that enables documents written in different character sets to be parsed and converted to a common, generic character set.

15. The apparatus of claim 1 in which extensions to capabilities of the computing device are made without affecting compatibility with existing clients or existing one of the one or more parsers and generators by the use of an updated/extended namespace plug-in that sets-up elements, attributes and attribute values for a namespace.

16. The apparatus of claim 1, wherein the computing device is further configured to utilize a static string pool table that maps mark-up language tokens to respective strings for providing string data to the parsers or generators.

17. A method comprising:
accessing, via a computing device, an extensible framework that accepts one or more mark-up language parsers or generators implemented as plug-ins, with different plug-ins enabling different kinds of markup languages to be handled;
enabling, via the extensible framework, the one or more mark-up language parsers or generators to access components to validate, pre-filter or alter data, in which the components are plug-in components to the extensible framework and operate using a chain of responsibility design pattern; wherein the one or more mark-up language parsers or generators uses a namespace collection to retrieve information about a specific namespace during the parsing or generating phrase;
enabling said one or more mark-up language parsers plug-ins or generators plug-ins to access data from a generic data supplier application programming interface (API);
enabling said generic data supplier API to access data from at least one data source; wherein the extensible framework and the generic data supplier API are loaded on a computing device, and, via said generic data supplier API, the extensible framework insulates said one or more mark-up language parsers or generators from direct communication with said at least one data source; and
causing, via the one or more mark-up language parser, a validator plug-in to be notified of elements the parser is parsing, the elements in turn going to an auto correction plug-in to be fixed if required and finally to a client that receives these elements.

18. The method of claim 17, further comprising extending capabilities of a device configured to access the extensible framework without affecting compatibility with existing clients or existing parsers and generators by the use of an updated/extended namespace plug-in that sets-up elements, attributes and attribute values for a namespace.

19. The method of claim 17, in which the extensible framework (i) insulates a client running on a device configured to access the extensible framework from having to communicate directly with the one or more parsers or generators and (ii) is generic in that it presents a common API to the client irrespective of specific kinds of parser or generator plug-ins deployed.

20. The method of claim 17, further comprising interacting with several kinds of parser plug-ins or generator plug-ins to the extensible framework via a client, each handling different mark-up language formats.

21. The method of claim 17, further comprising implementing a file conversion capability to parse a source file by the one or more parsers, which is adapted to handle one format and cause an output, converted file to be generated by the one or more generators, adapted to handle a different file format.

22. The method of claim 17, in which several different clients are able to share the same parsers or generators.

23. The method of claim 17, further comprising enabling, via the extensible framework, a parser or generator to access data from any source that conforms to the generic data supplier API.

24. The method of preceding claim 23, in which the source is a buffer in memory.

25. The method of preceding claim 23 in which the source is a file.

26. The method of preceding claim 23 in which the source is a socket outputting streaming data.

27. The method of claim 23, in which a data source is used that is different from any data sources which the device was capable of using when first operated by an end-user.

28. The method of preceding claim 17, in which the plug-in components present a common, generic API to one or more parsers or generators, enabling the same plug-in components to be used with different types of parsers or generators.

29. The method of claim 17, in which the plug-in components present a common, generic API to a client component using one or more parsers or generators, enabling the same plug-in components to be used by different clients.

30. The method of preceding claim 17, further comprising making a parsed element stack available to validation/pre-filter/altering plug-ins.

31. The method of claim 17, enabling, via a character conversion module, documents written in different character sets to be parsed and converted to a common, generic character set.

* * * * *